3,211,883
ARC WELDING WITH ARC STABILIZING ADDITIVES
Michael W. Zimmermann, Elm Grove, Wis., assignor to A. O. Smith Corporation, Milwaukee, Wis., a corporation of New York
Filed Aug. 31, 1962, Ser. No. 220,633
3 Claims. (Cl. 219—74)

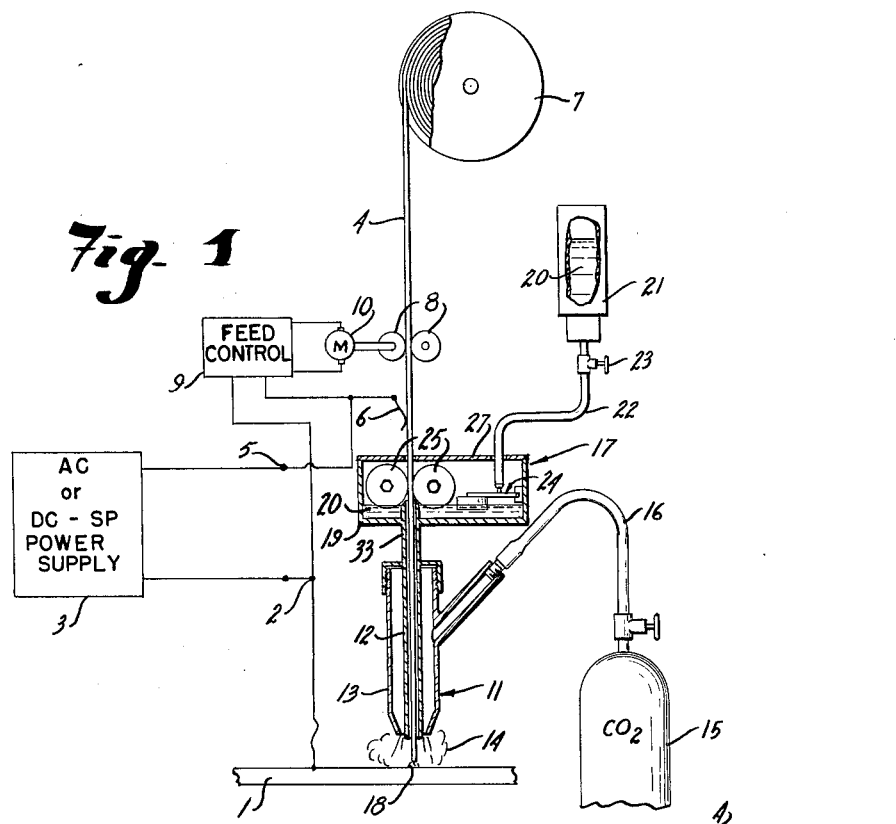
Fig. 1
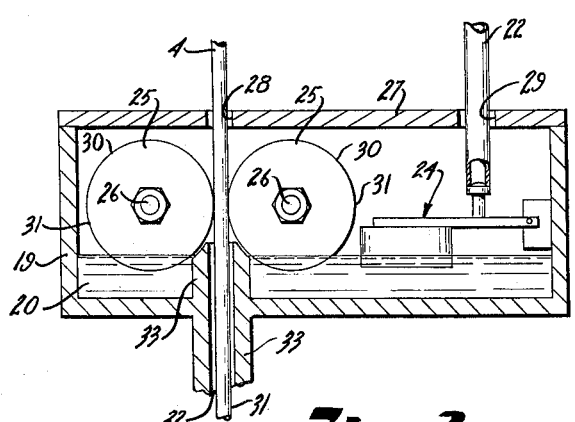
Fig. 3
Fig. 2
INVENTOR.
MICHAEL W. ZIMMERMANN
BY
Howard J. Barnett
Attorney United States Patent Office 3,211,883
Patented Oct. 12, 1965

This invention is directed to a method and apparatus for electric arc welding with a consumable electrode and more particularly to a method of gas shielded, consumable electrode arc welding in which arc stabilizing additives are applied to a bare metal electrode simultaneously with the welding operation. By the method of this invention, a liquid solution containing the arc stabilizing additives is applied to the bare metal electrode before it reaches the arc region to provide additional "smoothing" of the arc transfer.

In consumable bare wire electrode arc welding, particularly when carbon dioxide is employed as a shielding gas, considerable arc instability is experienced in a direct current, straight polarity welding circuit, and also when an alternating current power source is used.

It has been discovered that a great improvement in arc stability can be accomplished by the addition of various compounds which have thermionic properties, and will emit electrons when heated by the welding arc. Various methods for adding these thermionic compounds have been proposed, and have been tried with varying degrees of success.

The main problem, however, is that most of the desirable thermionic compounds are relatively unstable and tend to react with other commonly available materials to become more stable compounds which have lost the electron emissive properties. For example, a bare steel wire coil coated with an emissive compound of cesium has been stored for a short period of time in a completely sealed box. After the short storage period, the wire was examined and found unusable, because it had rusted on the exposed surfaces throughout its length.

The cesium compound is extremely hygroscopic, and had picked up all available moisture from the air, forming a hydrate, and, at the same time, greatly facilitating the rusting of the wire. Even when the externally coated wire is used prior to the rusting action just described, there is serious clogging of the welding wire feed rollers by the coating after short periods of use, and considerable down time is added for maintenance and cleaning of the welding apparatus. In addition, the external coating creates serious arc starting and electrical contact problems because the coating compounds are not good electrical conductors until heated.

Other methods of adding the thermionic compounds have also been tried, with varying degrees of success, and in most instances, considerable cost.

This invention is directed to a simple method and reliable apparatus for effectively adding thermionic arc stabilizing compounds to the arc. The compounds in a liquid form are added directly to the wire during welding Various applicators have been used to apply the solution to the welding electrode. It has been discovered that the preferable applicator comprises a pair of metal rollers which transfer a thin film of the solution from a source directly onto the bare metal wire. The flat surfaced metal rollers are preferred because only the required quantity of solution is applied to the electrode, with no excess solution to interfere with the beneficial effects of the emissive compounds in the arc.

All of the above mentioned problems are overcome by applying a solution containing the thermionic compounds to the arc welding wire as it is being used. Conventional welding apparatus may be used, with only the addition of the applicator, which is connected to a receptacle containing the solution of thermionic compounds. The applicator preferably contacts the welding wire after it has first traveled through the feed rollers and the electrical contact, but it has been found that there is no serious contact problem caused by the wet solution on the wire, even when it is applied to the wire before it has traveled through the contact point.

An important advantage of this invention is the greater facility obtained in providing arc stabilization. The moisture pickup problem is completely eliminated by storing the wire separately from the emissive materials until use. The electrical contact problem found in dry coated electrodes is minimized due to substantial reduction of the clogging of the drive rolls through pickup of the dry coating.

The drawings furnished herewith illustrate the best mode presently contemplated for carrying out the invention.

FIGURE 1 is a schematic diagram of the apparatus for arc welding in accordance with the present invention.

FIG. 2 is a schematic diagram showing a modification of the apparatus of FIGURE 1.

FIG. 3 is an enlarged sectional view showing the emissive material applicator.

In the drawings, a workpiece 1 to be welded is connected to a first terminal 2 of a source of alternating current or direct current indicated as power supply 3. A consumable electrode 4 is connected to a second terminal 5 of the power supply 3 by means of sliding contact 6, which allows movement of the electrode 4 relative to the contact 6. The electrode 4 is a bare steel electrode in wire or rod shape, and is deposited on the workpiece 1 by striking an arc between the workpiece and the electrode. The consumable electrode 4 can also be aluminum or some other fusible metal, as determined by the desired composition of the weld deposit. As welding progresses, the portion of the electrode adjacent the workpiece is burned off and transferred to the workpiece 1.

The electrode 4 is continuously drawn from a reel 7 by means of electrode feed rollers 8 to maintain the arc at the desire length during welding. The electrode feed control 9 is of the conventional type which drives the electrode feed motor 10 at a constant rate. The power supply is of the constant voltage type with an inherent self-adjusting arc characteristic due to an inductive reactance which is included in the circuit.

In this circuit, the current increases rapidly as there is a slight decrease in arc voltage due to a shortening of the arc. The increased current causes the electrode 4 to burn off more rapidly, thereby restoring normal arc length and volt-amp characteristics at the arc. As the arc length increases, the current decreases, and the burn off rate slows appreciably, thereby causing the arc length to decrease to normal.

The welding head 11 comprises an electrode guide tube 12 disposed inside a concentric gas nozzle 13 which is supplied with shielding gas 14 from source 15 through a gas conduit 16. An emissive material applicator assembly 17 is disposed around the electrode 4, either between the sliding contact 6 and the arc 18, as shown in FIG. 1, or the contact 6 may alternately be disposed between the emissive material applicator assembly 17 and the arc 18.

The applicator assembly 17 comprises a cup 19 adapted to contain a solution 20 containing emissive materials. The solution 20 is supplied from a remotely located tank 21 through conduit 22. Flow through conduit 22 may be manually controlled at valve 23, and automatically controlled by float valve 24, disposed in the cup 19. Float valve 24 maintains the solution 20 at a preset level at all times. A pair of smooth surfaced metal rollers 25 are rotatably disposed on horizontal shafts 26 in close relationship to each other, and rotate about a horizontal axis. In the embodiment shown, a dust cover 27 is shown disposed over the cup 19 to shield solution 20 from foreign matter. Opening 28 in the cover 27 is provided for passage therethrough of the electrode 4. A second opening 29 is also provided for conduit 22, which supplies the solution 20 to the cup 19.

Edges 30 of the rollers 25 dip into the solution 20 during rotation, picking up a thin film 31. Rotation of rollers 25 takes place as the electrode 4 is fed downwardly between the rollers and in contact with the opposed portions of their respective edges 30 bearing the film 31. As the electrode 4 moves between the rollers 25, the thin film 31 is transferred to the surface of the electrode, which then travels through an opening 32 in a bushing 33, which is disposed in the bottom of the cup 19 and extends upwardly into the cup 19 and above the level of solution 20. The bushing 33 also extends downwardly below cup 19 to connect to the welding head 11. The film 31 remains on the electrode 4 into the arc and provides arc stabilization.

The electrode 4 then is consumed at the arc 18. The emissive materials in the solution 20 provide arc stability by releasing electrons in the heat of the arc, thereby greatly facilitating arc reignition in A.C. welding. In D.C. straight polarity welding, in which the electrode is the cathode of the circuit, the emissive materials prevent the arc forces from building up a large globule on the end of the electrode, and promote a desirable spray-type arc transfer.

The apparatus and method of the invention has provided satisfactory stabilization of welds under the following conditions:

| | |
|---|---|
| Power source | AC–CP with iron core external reactance. |
| Volts | 25–35. |
| Amps | 400–450. |
| Wire electrode diameter | 1/16 inch. |
| Wire electrode composition: | |
| C | .12–.19%. |
| Mn | .95–1.3%. |
| Al | .50–.75%. |
| Si | .25–.45%. |
| Residual impurities | .45% maximum, Fe—Balance. |
| Travel speed | 27 i.p.m. |
| Shielding gas | $CO_2$ rate of 30–40 cu. ft. hr. |
| Electrode feed rate | 400 i.p.m. |
| Solution composition | 2 parts by weight water, 1 part the following: 20–28% $Rb_2CO_3$. 70–72% $K_2CO_3$. 2–5% $Cs_2CO_3$. |

The above example used metal rollers in the applicator assembly. This particular applicator construction proved to be the best of those tried because the metal rollers picked up and transferred only the minimum amount of the solution of emissive materials, and thereby minimized clogging and caking of excess materials on the welding head. Other applicators were used, but with less desirable results. Some of the materials supplied too much solution to the electrode, thereby stifling the desirable arc action with excess moisture. Other materials supplied erratic amounts of solution to the wire, and some other applicators tried were impractical because they were not durable and had to be replaced very frequently.

The important requirement of the applicator is that it be capable of continously supplying a small predetermined amount of solution to the wire continuously, and that it be relatively durable. Lack of durability proved to be a principal limiting factor in the use of many of the materials, and because the metal rollers are durable, and deposit only the required amount of solution on the wire, they are the preferred applicator material.

Other emissive compounds can be used instead of the example given above. Use of the following compounds and mixtures thereof, either in solution or suspension, is also contemplated: cesium nitrate, lithium carbonate, calcium carbonate, rubidium chloride, cesium chloride, cesium sulfate, cesium bromite, cesium iodide, cesium chromate, and cesium acetate. In general, compounds of alkali and alkaline earth metals exhibit the desired emissive properties, and can be used in the practice of the invention. The emissive material comprises generally from 25 to 60% by weight of the solution or suspension.

This invention provides novel means for stabilized arc welding, either A.C. or D.C.-straight polarity. In A.C. welding, the emissive materials greatly facilitate arc reignition every half-cycle, and in D.C.-straight polarity, the emissive materials eliminate globular transfer and cause a stable, spray-type arc phenomena.

Various modes of carrying out the invention are believed to be within the scope of the following claims particularly pointing out and distinctly claiming the subject matter which is regarded as the invention.

I claim:

1. The process of electric arc metal deposition wherein a bare metallic wire electrode and a metallic workpiece are connected to a source of electric power comprising, feeding said electrode toward said workpiece to establish and maintain an arc and deposition zone on said workpiece, disposing a plurality of bare metal rollers in positive metal-to-metal contact with said electrode to continuously apply a thin liquid film containing an electron emissive material onto said electrode simultaneously with the feeding of said electrode to said arc, simultaneously supplying a shielding gas to said arc to protect the weld from oxidation and simultaneously providing electrical contact to said electrode through said liquid by means of a sliding contact penetrating through the liquid to the electrode at a contact area between the arc and the area at which the liquid containing electron emissive materials is applied to said electrode.

2. The method of claim 1, in which the electric power source is an alternating current, constant potential transformer-rectifier welding machine.

3. The method of claim 1, in which the power source is a direct current, transformer-rectifier welding machine, and the electrode is negative.

References Cited by the Examiner

UNITED STATES PATENTS

| | | | |
|---|---|---|---|
| 1,439,972 | 12/22 | Noble | 314—21 X |
| 1,728,863 | 9/29 | Ipsen | 219—74 |
| 2,544,711 | 3/51 | Nickhalapov | 219—74 |
| 2,694,763 | 11/54 | Muller | 219—74 |

FOREIGN PATENTS 762,801   12/56   Great Britain.

RICHARD M. WOOD, *Primary Examiner.*